(12) United States Patent
Guo et al.

(10) Patent No.: US 11,683,696 B2
(45) Date of Patent: *Jun. 20, 2023

(54) ELECTRONIC DEVICE AND METHOD FOR WIRELESS COMMUNICATION AND COMPUTER READABLE STORAGE MEDIUM

(71) Applicant: Sony Group Corporation, Tokyo (JP)

(72) Inventors: Xin Guo, Beijing (CN); Chen Sun, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/588,348

(22) Filed: Jan. 31, 2022

(65) Prior Publication Data

US 2022/0159475 A1    May 19, 2022

Related U.S. Application Data

(63) Continuation of application No. 16/652,681, filed as application No. PCT/CN2019/070819 on Jan. 8, 2019, now Pat. No. 11,284,269.

(30) Foreign Application Priority Data

Jan. 12, 2018  (CN) .......................... 201810030980.8

(51) Int. Cl.
*H04W 72/00* (2023.01)
*H04W 16/14* (2009.01)
*H04W 52/30* (2009.01)

(52) U.S. Cl.
CPC ........... *H04W 16/14* (2013.01); *H04W 52/30* (2013.01)

(58) Field of Classification Search
CPC .............................. H04W 16/14; H04W 52/30
(Continued)

(56) References Cited

U.S. PATENT DOCUMENTS

2009/0047950 A1    2/2009 Doppler et al.
2011/0039554 A1    2/2011 Bims
(Continued)

FOREIGN PATENT DOCUMENTS

| CN | 105208563 A | 12/2015 |
| CN | 107040325 A | 8/2017 |
| WO | 2015/054408 A2 | 4/2015 |

OTHER PUBLICATIONS

International Search Report and Written Opinion dated Mar. 18, 2019 for PCT/CN2019/070819 filed on Jan. 3, 2019, 9 pages including English Translation of the International Search Report.

*Primary Examiner* — Temica M Beamer
(74) *Attorney, Agent, or Firm* — Xsensus LLP

(57) ABSTRACT

The present disclosure provides an electronic device and a method for wireless communication and a computer readable storage medium. The electronic device comprises: a processing circuit, configured to: allocate a spectrum resource for a spectrum allocation object of a first set managed by a first level spectrum management device; and to generate spectrum coordination information for a spectrum allocation object of a second set managed by a second level spectrum management device located on a lower level of the first level spectrum management device, so as to provide the same to the second level spectrum management device, wherein the spectrum coordinate information is used for coordination of spectrum allocation executed by the second level spectrum management device and spectrum allocation executed by the first level spectrum management device.

12 Claims, 12 Drawing Sheets

(58) Field of Classification Search
USPC .................................................. 455/452.1
See application file for complete search history.

(56) References Cited

U.S. PATENT DOCUMENTS

| | | |
|---|---|---|
| 2012/0115525 A1 | 5/2012 | Kang et al. |
| 2015/0119014 A1 | 4/2015 | Muraoka et al. |
| 2017/0201997 A1 | 7/2017 | Cheng et al. |
| 2018/0270669 A1 | 9/2018 | Fortman et al. |
| 2019/0014582 A1 | 1/2019 | Yogev |

ELECTRONIC DEVICE AND METHOD FOR WIRELESS COMMUNICATION AND COMPUTER READABLE STORAGE MEDIUM

CROSS-REFERENCE TO RELATED APPLICATIONS

The present application is a continuation of U.S. application Ser. No. 16/652,681, filed Apr. 1, 2020, which is based on PCT filing PCT/CN2019/070819, filed Jan. 8, 2019, which claims priority to Chinese Patent Application No. 201810030980.8, filed Jan. 12, 2018 with China National Intellectual Property Administration, each of which is incorporated herein by reference in its entirety.

FIELD

Embodiments of the present disclosure generally relate to the field of wireless communications, in particular to coexistence management on shared spectrum resources, and more particularly to an electronic apparatus and a method for wireless communications, and a computer readable storage medium.

BACKGROUND

With rapid increase of the number of wireless communication devices and increasing diversification of wireless services, a problem of spectrum scarcity becomes increasingly serious. A promising solution is spectrum sharing. Multiple systems share a target frequency band by coexistence coordination, to improve resource utilization efficiency. Frequency bands that are currently open for sharing include, for example, 3.5 GHz frequency band, 5 GHz frequency band, 6 GHz frequency band and so on. When spectrum resources on a shared frequency band are utilized, a spectrum utilization requirement on the shared frequency band should be met. For example, an authorized user on the frequency band or a high-priority level user should be protected while taking fairness and the resource utilization efficiency into account.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

An electronic apparatus for wireless communications is provided according to an aspect of the present disclosure. The electronic apparatus includes processing circuitry. The processing circuitry is configured to: with respect to a first set of spectrum allocation objects managed by a first level spectrum manager, allocate spectrum resources; and with respect to a second set of spectrum allocation objects managed by a second level spectrum manager at a lower level of the first level spectrum manager, generate spectrum coordination information to be provided to the second level spectrum manager. The spectrum coordination information is used for coordination between spectrum allocation performed by the second level spectrum manager and spectrum allocation performed by the first level spectrum manager.

An electronic apparatus for wireless communications is provided according to another aspect of the present disclosure. The electronic apparatus includes processing circuitry. The processing circuitry is configured to: acquire spectrum coordination information for a second set of spectrum allocation objects managed by a second level spectrum manager; and perform, at least based on the spectrum coordination information, spectrum allocation for the spectrum allocation objects in the second set. The spectrum coordination information is used for coordination between spectrum allocation performed by the second level spectrum manager and spectrum allocation performed by a first level spectrum manager at an upper level of the second level spectrum manager.

An electronic apparatus for wireless communications is provided according to another aspect of the present disclosure. The electronic apparatus includes processing circuitry. The processing circuitry is configured to: with respect to a first set of spectrum allocation objects managed by a first level spectrum manager, allocate spectrum resources; and with respect to the first set of spectrum allocation objects, generate spectrum coordination information to be provided to another first level spectrum manager. The spectrum coordination information is used for coordination between spectrum allocation performed by the first level spectrum manager and spectrum allocation performed by the other first level spectrum manager.

A method for wireless communications is provided according to another aspect of the present disclosure. The method includes: with respect to a first set of spectrum allocation objects managed by a first level spectrum manager, allocating spectrum resources; and with respect to a second set of spectrum allocation objects managed by a second level spectrum manager at a lower level of the first level spectrum manager, generating spectrum coordination information to be provided to the second level spectrum manager. The spectrum coordination information is used for coordination between spectrum allocation performed by the second level spectrum manager and spectrum allocation performed by the first level spectrum manager.

A method for wireless communications is further provided according to another aspect of the present disclosure. The method includes: acquiring spectrum coordination information for a second set of spectrum allocation objects managed by a second level spectrum manager; and performing, at least based on the spectrum coordination information, spectrum allocation for the spectrum allocation objects in the second set. The spectrum coordination information is used for coordination between spectrum allocation performed by the second level spectrum manager and spectrum allocation performed by a first level spectrum manager at an upper level of the second level spectrum manager.

A method for wireless communications is further provided according to another aspect of the present disclosure. The method includes: with respect to a first set of spectrum allocation objects managed by a first level spectrum manager, allocating spectrum resources; and with respect to the first set of spectrum allocation objects, generating spectrum coordination information to be provided to another first level spectrum manager. The spectrum coordination information is used for coordination between spectrum allocation performed by the first level spectrum manager and spectrum allocation performed by the other first level spectrum manager.

According to other aspects of the present disclosure, there are further provided computer program codes and computer program products for implementing the methods above, and a computer readable storage medium having recorded thereon the computer program codes for implementing the methods described above.

With the electronic apparatus and the method according to the present disclosure, spectrum coordination information is interchanged among different spectrum managers so as to coordinate spectrum allocation performed by the different spectrum managers, thereby reducing a probability of resource utilization conflict occurring, and improving the resource utilization efficiency.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure.

In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
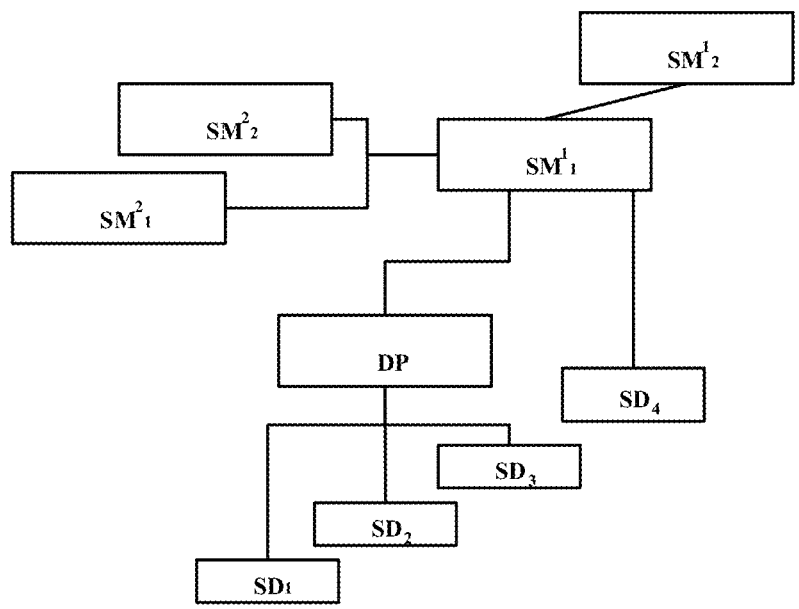
FIG. 1 shows a schematic example of a configuration of a shared spectrum allocation system.

FIG. 1 shows a schematic example of a configuration of a shared spectrum allocation system. In this example, the shared spectrum allocation system includes multiple spectrum managers (SM). Each of the SMs manages multiple service devices (SD). Each of the SDs may be a network configured by multiple wireless communication devices. The network includes at least two transmission directions, namely, an uplink transmission direction and a downlink transmission direction. For example, the SD may be a cell of a cellular network, or a network formed by a WIFI access point and a WIFI device. The SD may directly perform data interaction with the SM, or may perform data interaction with the SM via an intermediate information forwarding node such as a Domain Proxy (DP) shown in FIG. 1.

In addition, as shown in FIG. 1, the SM may have a multi-level structure. A superscript of the SM represents a level to which the SM belongs. A subscript of the SM represents a serial number of the SM. For example, $SM^1_2$ represents a second SM of a first level, and $SM^2_1$ represents a first SM of a second level. A first level SM is at an upper level of a second level SM. The second level SM manages a part of the multiple SDs managed by the first level SM which the second level SM is subordinate to.

On one hand, in a case that multiple SDs managed by multiple first level SMs are distributed in one geographical region and available spectrums are not orthogonalized, a resource utilization conflict may occur among the multiple SDs in the geographical region due to lack of coexistence coordination. The conflict may be reflected as, for example, co-channel interference or adjacent-channel interference. On the other hand, in a case that multiple SDs (forming a first set Set managed by any first level SM (for example, $SM^1_1$) are further managed by multiple second level SMs (such as $SM^2_1$ and $SM^2_2$), SDs managed by each second level SM form a part of the first set $Set^1_1$, for example, a second set $Set^2_1$ and a second set $Set^2_2$, respectively. The $SM^1_1$ performs spectrum allocation based on the first set $Set^1_1$ and interference information among the SDs in the set. An allocation result is sent to corresponding second level spectrum managers $SM^2_1$ and $SM^2_2$ in units of the second sets $Set^2_1$ and $Set^2_2$. If the SDs included in the second sets $Set^2_1$ and $Set^2_2$ are distributed in the same geographical region and the available spectrums are not orthogonalized, in a case that the second level spectrum manager $SM^2_1$ performs spectrum allocation based on SDs managed by the second level spectrum manager $SM^2_1$ and local interference information and the second level spectrum manager $SM^2_2$ performs spectrum allocation based on SDs managed by the second level spectrum manager $SM^2_2$ and local interference information, a resource utilization conflict may also occur due to lack of coexistence coordination.

Figure 2:
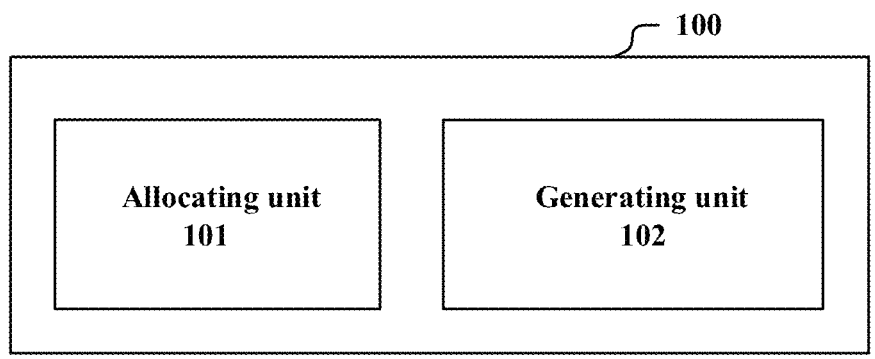
FIG. 2 is a block diagram showing functional modules of an electronic apparatus for wireless communications according to an embodiment of the present disclosure.

A solution for solving or mitigating the above resource utilization conflict is provided according to the present embodiment. FIG. 2 is a block diagram showing functional modules of an electronic apparatus 100 for wireless communications according to this embodiment. As shown in FIG. 2, the electronic apparatus 100 includes an allocating unit 101 and a generating unit 102. The allocating unit 101 is configured to, with respect to a first set of spectrum allocation objects managed by a first level spectrum manager (SM), allocate spectrum resources. The generating unit 102 is configured to, with respect to a second set of spectrum allocation objects managed by a second level spectrum manager at a lower level of the first level spectrum manager, generate spectrum coordination information to be provided to the second level spectrum manager. The spectrum coordination information is used for coordination between spectrum allocation performed by the second level spectrum manager and spectrum allocation performed by the first level spectrum manager.

The allocating unit 101 and the generating unit 102 may be implemented by one or more processing circuitry. The processing circuitry may be implemented as, for example, a chip. The spectrum allocation object refers to, for example, a service device to which spectrum is to be allocated. The electronic apparatus 100 according to the present disclosure is described below in detail with reference to the example of the shared spectrum allocation system shown in FIG. 1. However, it should be understood that the electronic apparatus 100 according to the present disclosure is not limited to being applied to the shared spectrum allocation system shown in FIG. 1, but may be appropriately applied to various shared spectrum allocation systems having multi-level spectrum managers.

The electronic apparatus 100 may be, for example, located in the first level spectrum manager or communicatively connected to the first level spectrum manager. For example, in a case that spectrum resources to be allocated are located on 3.5 GHz frequency band, the first level SM may be implemented as a Spectrum Access System (SAS), the second level SM may be implemented as a Coexistence Manager (CxM), and the spectrum allocation object is a Citizens Broadband Radio Service Device (CBSD). The first level SM and the second level SM may be implemented as one instance or may be implemented as two independent instances. In a case that the spectrum resources to be allocated are located on 5 GHz frequency band, the first level SM may be implemented as a Central Controller and Coordinator (C3) Instance, and the spectrum allocation object is a Wireless Access System/Radio Local Area Network (WAS/RLAN).

In an example, the allocating unit 101 may allocate the spectrum resources based on spectrum allocation objects and interferences among the spectrum allocation objects. For example, a spectrum allocation result may be expressed as available frequencies, available time, and available power (for example, an allowable maximum power).

For example, the interferences among the spectrum allocation objects may be calculated based on a channel model. In an example, whether there are interferences between two spectrum allocation objects is determined based on whether signal coverage ranges for the two spectrum allocation objects overlap. For example, the signal coverage range of the spectrum allocation object may be estimated based on signal emission power in combination with the channel model. In a case that the signal coverage ranges for the two spectrum allocation objects overlap, it is indicated that there are mutual interferences between the two spectrum allocation objects. For example, the allocating unit 101 may allocate the spectrum resources by constructing a graph.

Figure 3:
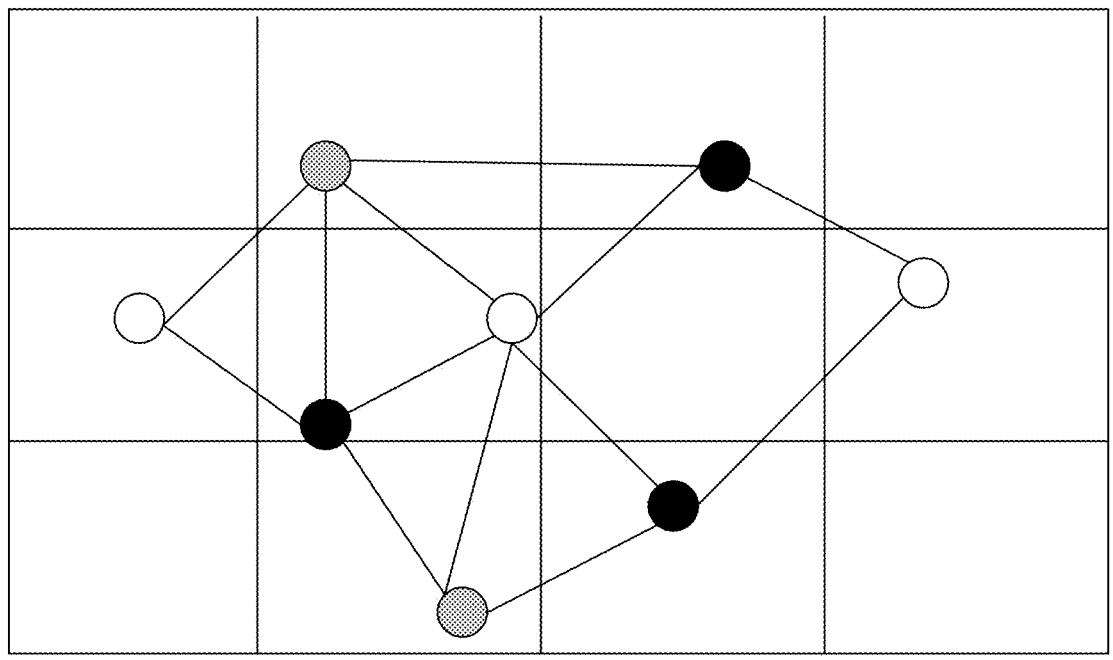
FIG. 3 schematically shows an example of a graph.

FIG. 3 schematically shows an example of a constructed graph. Vertexes are represented by circles. Each vertex represents one or a group of spectrum allocation objects. An edge between two vertexes represents that coverage rangers for the two spectrum allocation objects or the two groups of spectrum allocation objects overlap, which may result in mutual interferences. Squares represent geographical regions. Grayscale filled in a circle represents spectrum resources allocated to the vertex represented by the circle. Different spectrum resources are represented by different grayscales. As shown in FIG. 3, for example, orthogonal spectrum resources may be allocated to two vertexes connected to each other via an edge, and non-orthogonal spectrum resources (for example, the same spectrum resources) may be allocated to two vertexes not connected to each other via any edge.

A spectrum allocation result acquired by the allocating unit 101 may not be specific to each spectrum allocation object. For example, with respect to the second set of spectrum allocation objects managed by the second level SM, the allocating unit 101 may acquire available spectrum resources for the entire second set, and the second level SM determines how to allocate these available spectrum resources based on local information. As described above, in the case that non-orthogonal spectrum resources are allocated to different second level SMs, the resource utilization conflict may occur due to lack of coordination.

In this embodiment, spectrum coordination information is provided to solve the conflict. In addition to the spectrum allocation result, the first level SM further provides the spectrum coordination information to the second level SM. Specifically, the spectrum coordination information, for example, is used for coordination between spectrum allocation performed by the second level SM and spectrum allocation performed by the first level SM. In other words, the spectrum coordination information provides further guidance from the first level SM on the spectrum allocation performed by the second level SM.

In an example, the spectrum coordination information includes spectrum utilization constraint for the second set of spectrum allocation objects. The spectrum allocation result is represented by, for example, a resource pool allocated to the second set. The spectrum utilization constraint provides a constraint condition for utilizing spectrum resources in the allocated resource pool. The constraint condition may be based on time, space, or power.

The spectrum utilization constraint and the spectrum allocation result that includes the allocated resource pool are provided. On one hand, compared with a case of allocation result specific to each spectrum allocation object, signaling overhead is reduced, privacy of the spectrum allocation object is protected, and resource allocation for the second set of spectrum allocation objects is flexible. The spectrum resources can be dynamically adjusted within the second set on the premise that the constraint condition is met. On the other hand, compared with a case that the allocation result only specifies the spectrum pool, the spectrum utilization constraint can provide support and performance guarantee for multiple second sets sharing the spectrum pool.

For example, the spectrum utilization constraint may include one or more of the following: a total emission power of the spectrum allocation objects within a particular geographical region does not exceed a predetermined power; the number of spectrum allocation objects emitting simultaneously within the particular geographical region does not exceed a predetermined value; a total emission power of the spectrum allocation objects on a particular frequency does not exceed a predetermined power; the number of spectrum allocation objects emitting simultaneously on a particular frequency does not exceed a predetermined value; a total emission power of the spectrum allocation objects within a particular geographical region on a particular frequency does not exceed a predetermined power; and the number of spectrum allocation objects emitting simultaneously within the particular geographical region on a particular frequency does not exceed a predetermined value.

Referring to FIG. 3, the particular geographical region may be a geographical region shown in FIG. 3, but is not limited thereto. For example, the particular geographical region may be a region with any unit area or a geographical region specified in other manners. The particular frequency may be, for example, a unit spectrum range, a predetermined spectrum range or the like.

Figure 4:
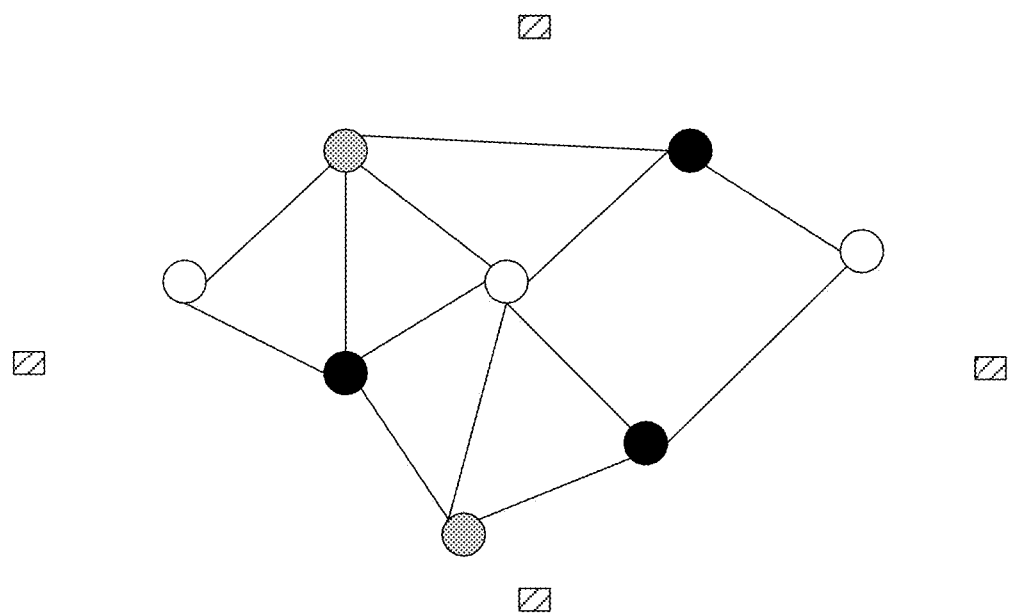
FIG. 4 schematically shows an example of a reference point.

In addition, as shown in FIG. 4, reference points represented by squares having diagonal lines are added compared with FIG. 2. These reference points represent geographical positions or geographical regions. Accordingly, the spectrum utilization constraint may further include one or more of the following: a power received at a predetermined reference point from the spectrum allocation objects does not exceed a predetermined power; and a power received at a predetermined reference point on a particular frequency from the spectrum allocation objects does not exceed a predetermined power.

Some examples of the spectrum utilization constraint are given above, but the spectrum utilization constraint is not limited thereto and may be set based on actual requirements.

In another example, the spectrum coordination information may include constraint on a spectrum allocation rule for the second set of spectrum allocation objects. This is because, in a case of using some spectrum allocation methods, characteristics of the spectrum allocation methods may result in a non-unique spectrum allocation result even though the allocated resource pool is determined. Therefore, by providing the constraint on the spectrum allocation rule, a range of the allocation result can be reduced, information consistency can be achieved, or coexistence management based on information consistency can be achieved.

The constraint on the spectrum allocation rule is related to a specific spectrum allocation method. For example, in a graph-based spectrum allocation method, the constraint on the spectrum allocation rule may include one or more of the following: 1) specifying an investigating order of the spectrum allocation objects and specifying an investigating order of unit spectrum resources to be allocated; and 2) specifying a characteristic set of the spectrum allocation objects and a spectrum allocation result for the spectrum allocation objects of the characteristic set.

Figure 5:
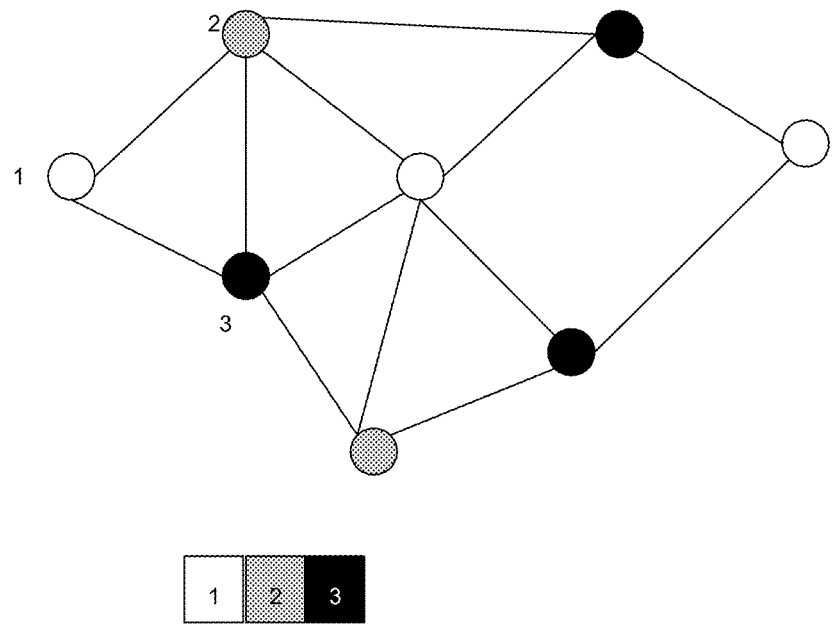
FIG. 5 is a schematic diagram showing spectrum allocation with constraint on a spectrum allocation rule.

FIG. 5 is a schematic diagram showing spectrum allocation with the constraint in 1). Definitions of vertexes and edges are the same as those in FIG. 3. Numbers next to the vertexes represent an order in which the spectrum allocation objects corresponding to the vertexes are investigated. Squares with different grayscales represent different unit spectrum resources. Numbers on the squares represent an order in which spectrum resources corresponding to the grayscales are investigated. A grayscale filled in a vertex represents that the spectrum resource corresponding to the grayscale is allocated to a spectrum allocation object corresponding to the vertex. The investigating order is, for example, from first to last with the numbers from small to large.

It can be seen that after the above two investigating orders are specified, a coloring scheme (that is, the grayscale filling scheme) for the vertexes is determined. That is, a determined spectrum allocation result is acquired.

Figure 6:
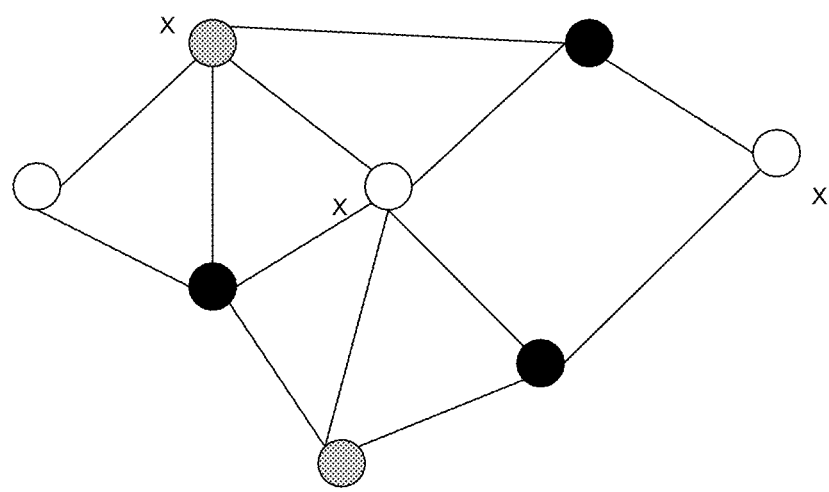
FIG. 6 is another schematic diagram showing spectrum allocation with constraint on a spectrum allocation rule.

FIG. 6 is a schematic diagram showing spectrum allocation with the constraint in 2). Vertexes marked with "x" form the specified characteristic sets. As shown in FIG. 6, after spectrum allocation results of the spectrum allocation objects of the characteristic set are specified, spectrum allocation results of other vertexes are determined accordingly.

The characteristic set may be determined based on a target of the constraint. For example, the characteristic set may be defined as follows. A characteristic set is a set including fewest vertexes in the graph. Once the spectrum allocation results of the Vertexes in the characteristic set are determined, a spectrum allocation result for the entire graph is uniquely determined.

It should be understood that other forms of constraints on the spectrum allocation rule may be defined in other spectrum allocation methods, and the above-mentioned constraint is not restrictive.

In another example, the spectrum coordination information includes information of the spectrum allocation objects within the second set and mutual interference relationship among the spectrum allocation objects within the second set. That is, the first level SM provides information of the interference relationship, based on which the first level SM performs the spectrum allocation, to the second level SM, to achieve the coexistence management. For example, the spectrum allocation objects within the second set included in the spectrum coordination information are spectrum allocation objects currently in an active state.

For example, the information may be represented in a form of an abstract model based on graph theory. That is, the first level SM may directly provide the constructed graph to the second level SM, including a vertex set and an edge set.

Alternatively, the information may be represented in a form of a generation method of an abstract model based on graph theory. That is, the first level SM may provide a rule of information required to construct the graph to the second level SM. The information includes mapping relationship between a vertex and a spectrum allocation object, and a generation condition for an edge in the graph. For example, the vertex corresponds to one spectrum allocation object or a set of spectrum allocation objects. The generation condition for the edge may include, for example, one of the following: calculated signal coverages for spectrum allocation objects corresponding to vertexes overlap with each other; there are interferences among spectrum allocation objects corresponding to the vertexes calculated based on a channel model; and there are interferences between spectrum allocation objects corresponding to the vertexes obtained by measurement.

In addition, the spectrum coordination information may further include any combination of two or three of the three types of information described above, to achieve coordination of spectrum allocation operations among different levels of SMs together. With the spectrum coordination information, fairness of spectrum allocation for an entire system can be achieved and requirements for spectrum allocation efficiency can be met, while taking the signaling overhead and flexibility of the spectrum allocation into account.

Second Embodiment

A procedure of information interaction between spectrum managers is described in detail in this embodiment.

Figure 7:
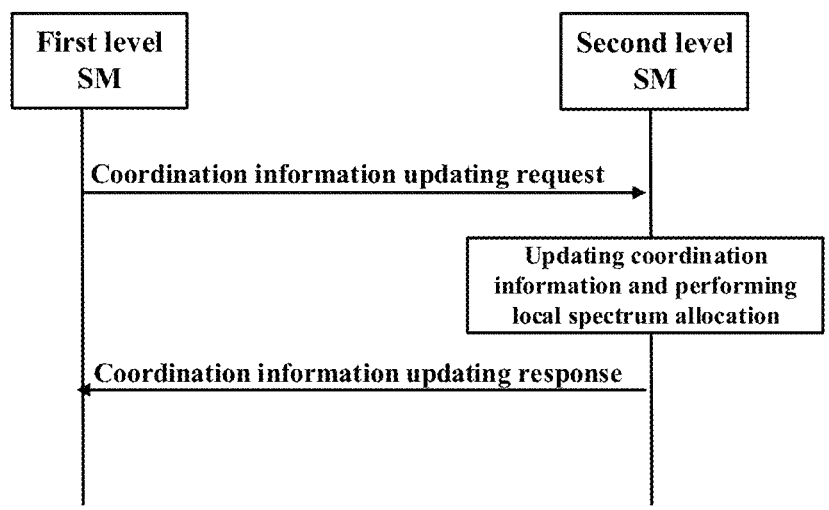
FIG. 7 is a schematic diagram showing a procedure of notifying coordination information between a first level spectrum manager (SM) and a second level SM.

First, FIG. 7 is a schematic diagram showing a procedure of notifying coordination information between a first level SM and a second level SM. For example, the generating unit 102 generates a coordination information updating request. A communication unit (not shown in FIG. 2) in the electronic apparatus sends the coordination information updating request to the second level SM. The communication unit may be implemented as, for example, various antennas or antenna arrays as well as the driving circuitry therefor, and is configured to send and receive related information herein.

The coordination information updating request may include updated spectrum coordination information with respect to the second set of spectrum allocation objects. It should be noted that the procedure of notifying coordination information shown in FIG. 7 may be performed simultaneously with the procedure of the first level SM notifying the spectrum allocation (re-allocation) result. Alternatively, the procedure of notifying coordination information shown in FIG. 7 may be performed separately in a case that the spectrum allocation result (for example, the allocated resource pool) is not changed. In the latter case, only the spectrum coordination information is updated.

As shown in FIG. 7, when receiving the coordination information updating request, the second level SM acquires spectrum coordination information from the coordination information updating request, updates local spectrum coordination information using the acquired spectrum coordination information, and then performs local spectrum allocation based on the updated spectrum coordination information. Next, the second level SM sends a coordination information updating response to the first level SM, as a reply to the coordination information updating request.

Figure 8:
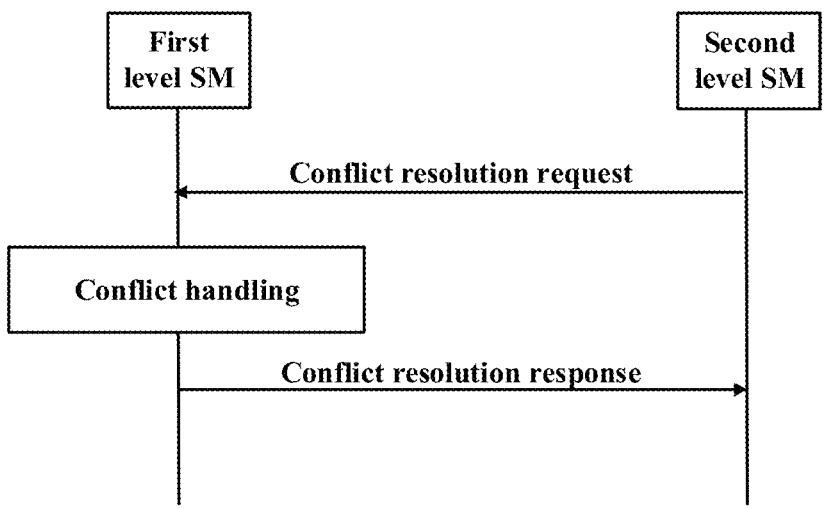
FIG. 8 is a schematic diagram showing a procedure of handling a spectrum utilization conflict between a first level SM and a second level SM.

FIG. 8 is a schematic diagram showing a procedure of handling a spectrum utilization conflict between a first level SM and a second level SM. For example, the second level SM sends a conflict resolution request to a first level SM that manages the second level SM. The first level SM processes and makes a response. The spectrum utilization conflict may be reported by a spectrum allocation object managed by the second level SM, that is, a service device. For example, in a case that it is preferable to request the first level SM to handle the conflict, or negotiation cannot be performed between second level SMs (for example, no information interface is provided, or a second level SM that is capable of performing negotiation cannot be found), or the conflict cannot be handled by negotiation between second level SMs, the second level SM may request the first level SM to handle the conflict.

The conflict resolution request may include information of a victim spectrum allocation object (that is, a victim service device, which indicates that the service device is subject to severe intra-frequency or inter-frequency interferences, affecting its normal communication). The first level SM handles the conflict without affecting a service device which the first level SM currently serves, and sends a conflict resolution response to the second level SM as a reply to the conflict resolution request.

Figure 9:
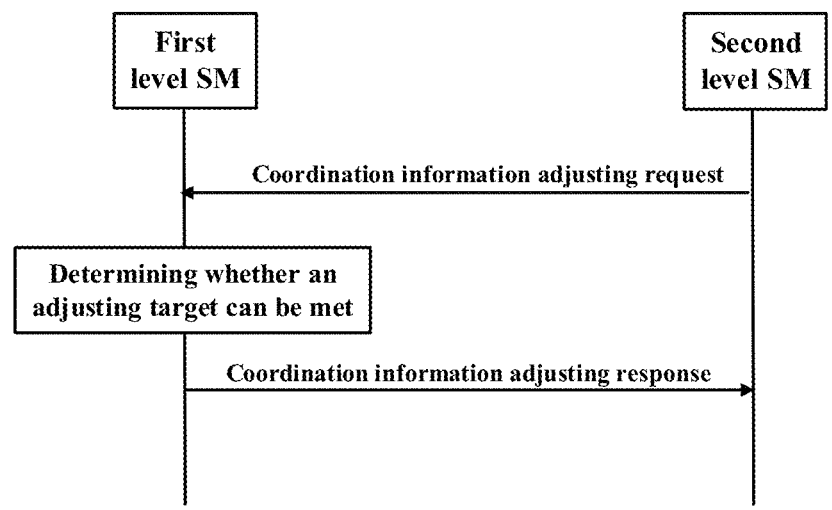
FIG. 9 is a schematic diagram showing a procedure of adjusting coordination information between a first level SM and a second level SM.

FIG. 9 is a schematic diagram showing a procedure of adjusting coordination information between a first level SM and a second level SM. The second level SM sends a coordination information adjusting request to the first level SM. The coordination information adjusting request includes adjusting information serving as an adjusting target. When receiving the coordination information adjusting request, the first level SM checks whether the adjusting target can be met, such as whether the service device which the first level SM currently serves would be affected, whether spectrum utilization efficiency of the entire system is improved in a case that the adjusting target is met, and the like. Then, the first level SM sends a coordination information adjusting response to the second level SM, that is, sends a result for the adjusting request. With this procedure, each second level SM acquires better spectrum coordination information settings based on local information, so as to further improve spectrum utilization efficiency of the system.

In addition, the first level SM may further provide its spectrum coordination information to other first level SMs. The provided spectrum coordination information may be spectrum coordination information of all or a part of the spectrum allocation objects in the first set. For example, only spectrum coordination information related to spectrum management objects in an overlapped part of management regions of two SMs may be provided. This spectrum coordination information may have the forms described in the first embodiment. Further, in a broad sense, the spectrum coordination information may further include a spectrum allocation result, for example, the allocated resource pool.

Figure 10:
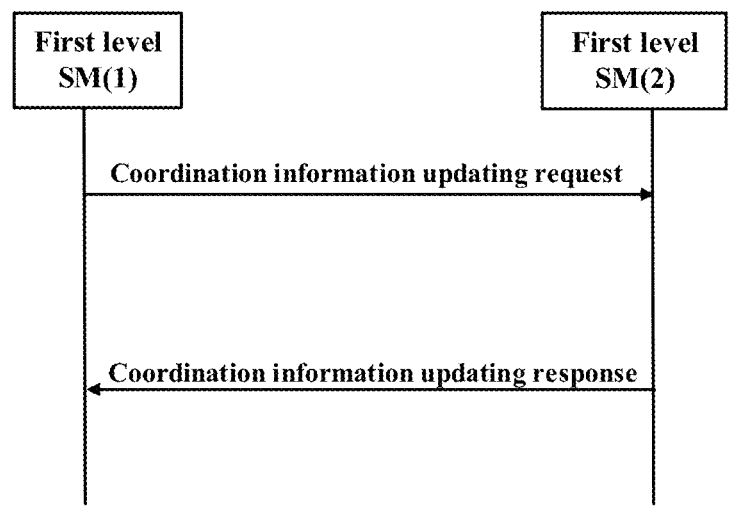
FIG. 10 is a schematic diagram showing a procedure of sharing coordination information between two first level SMs.

FIG. 10 is a schematic diagram showing a procedure of sharing coordination information between two first level SMs. With this process, each first level SM independently performs spectrum allocation for spectrum allocation objects (that is, service devices) managed by the first level SM, and coordinates spectrum sharing between these spectrum allocation objects and other spectrum allocation objects managed by other first level SMs located in the same geographical region.

As shown in FIG. 10, a first level SM (1) sends a coordination information updating request to a first level SM (2). The coordination information updating request includes spectrum coordination information updated by the first level SM (1), so as to request the first level SM (2) to receive the update. After receiving the update, the first level SM (2) sends a response to the first level SM (1) to acknowledge the update of the spectrum coordination information. Accordingly, the first level SM (1) acquires update acknowledgement for the spectrum coordination information from the first level SM (2). The procedure shown in FIG. 10 may be referred to as a push type procedure.

Figure 11:
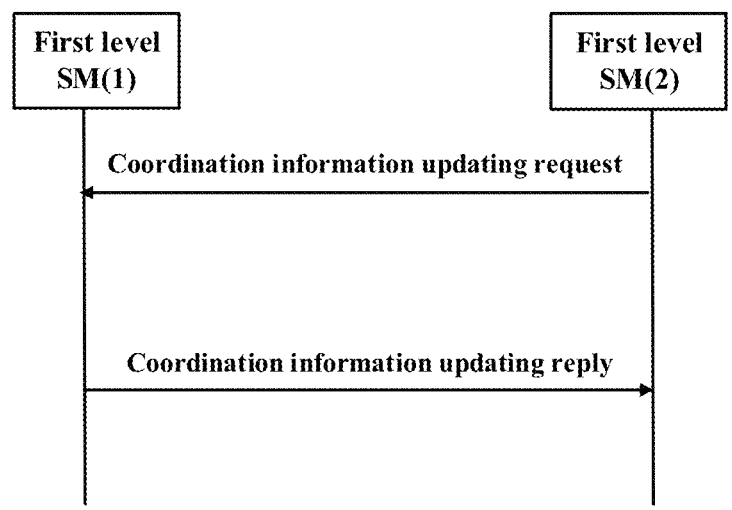
FIG. 11 is another schematic diagram showing a procedure of sharing coordination information between two first level SMs.

FIG. 11 is a schematic diagram showing another procedure of sharing coordination information between two first level SMs. The first level SM (2) sends a coordination information updating request to the first level SM (1), to request the first level SM (1) to update spectrum coordination information of the first level SM (1). The first level SM (1) sends a coordination information updating reply in response to the coordination information updating request. The coordination information updating reply includes the updated spectrum coordination information. The procedure shown in FIG. 11 may be referred to as a pull type procedure. In embodiments of the present disclosure, a manner for sharing information between information interaction interfaces of the two first level SMs may support at least one of the push type procedure and the pull type procedure.

Figure 12:
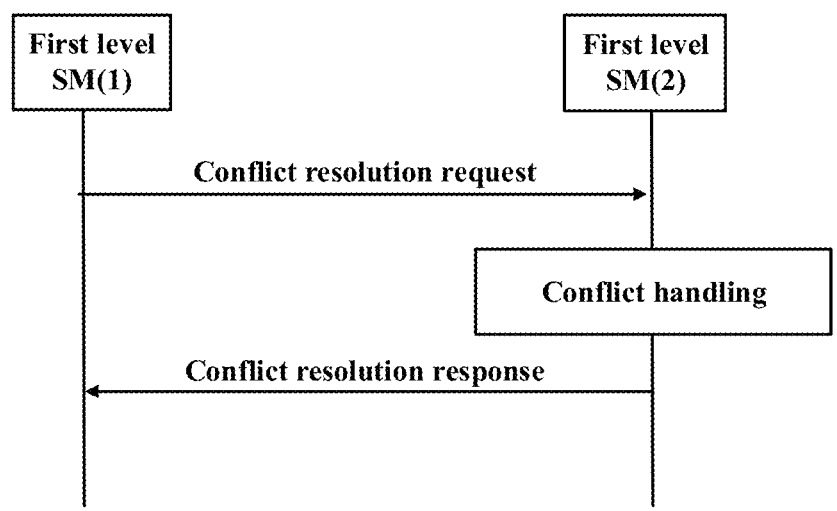
FIG. 12 is a schematic diagram showing a procedure of handling a spectrum utilization conflict between two first level SMs.

In addition, in a case of a spectrum utilization conflict occurring, the generating unit 102 may further generate a conflict resolution request to be provided to the other first level SM which is to handle the conflict. FIG. 12 is a schematic diagram showing a procedure of negotiating for a spectrum utilization conflict between two first level SMs. With this procedure, the first level SMs can coordinate to handle the spectrum utilization conflict on the premise of following the interchanged spectrum coordination information. The spectrum utilization conflict may be reported by the second level SM or a service device managed by the first level SM.

As shown in FIG. 12, when detecting a spectrum utilization conflict, the first level SM (1) generates a conflict resolution request, and sends the conflict resolution request to the first level SM (2). The request may include information of a victim spectrum allocation object. The first level SM (2) receives the conflict resolution request and handles the conflict based on information included in the conflict resolution request. For example, the first level SM (2) attempts to handle the conflict without changing the spectrum coordination information. Subsequently, the first level SM (2) sends a handling result of the conflict to the first level SM (1) as a response to the conflict resolution request.

When handling the conflict, the procedure of handling spectrum utilization conflict shown in FIG. 12 may be performed one or more times. Further, if the conflict cannot be resolved based on the interchanged spectrum coordination information, a procedure of adjusting coordination information may be performed. For example, the generating unit 102 generates a coordination information adjusting request to be provided to another first level SM which is to process the request. The coordination information adjusting request may include an adjusting target for spectrum coordination information of another first level SM.

Figure 13:
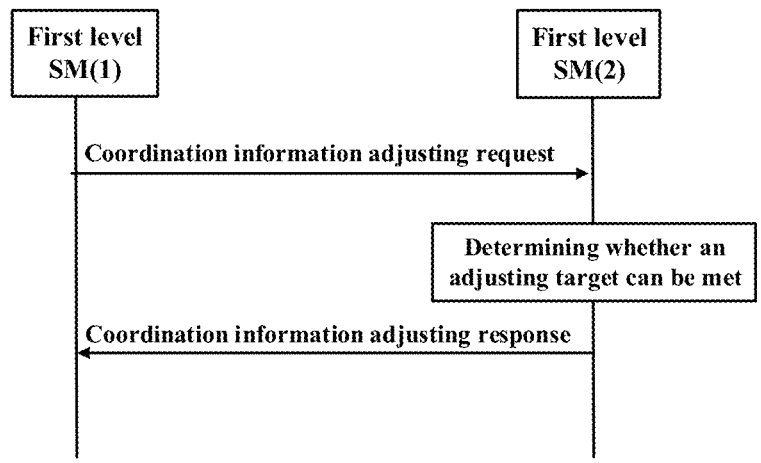
FIG. 13 is a schematic diagram showing a procedure of adjusting coordination information between two first level SMs.

FIG. 13 is a schematic diagram showing a procedure of adjusting coordination information between two first level SMs. In addition to being used to resolve the spectrum utilization conflict, the coordination information can also be adjusted to cause the first level SM to adapt new service requirements of the service device, or for other purposes.

As shown in FIG. 13, the first level SM (1) sends a coordination information adjusting request to the first-level SM (2). The coordination information adjusting request includes an adjusting target for the spectrum coordination information of the first level SM (2). The first level SM (2) checks whether the adjusting target can be met. For example, the first level SM (2) performs corresponding adjustment if the adjusting target can be met. Subsequently, the first level SM (2) sends a coordination information adjusting response to the first level SM (1) to report an adjusting result.

A premise for determining whether the adjusting target can be met may include, for example, not affecting a service device currently being served, improving spectrum utilization efficiency of the entire system, or the like.

In addition, based on the above description, an electronic apparatus for wireless communications is further provided. The electronic apparatus includes an allocating unit 101 and a generating unit 102. The allocating unit 101 is configured to, with respect to a first set of spectrum allocation objects managed by a first level SM, allocate spectrum resources. The generating unit 102 is configured to, with respect to the first set of spectrum allocation objects, generate spectrum coordination information to be provided to another first level SM. The spectrum coordination information is used for coordination between spectrum allocation performed by the first level SM and spectrum allocation performed by the other first level SM.

The spectrum coordination information may include information of spectrum utilization constraint of the first set of spectrum allocation objects; and/or, the spectrum coordination information may include constraint on a spectrum allocation rule; and/or, the spectrum coordination information may include information of spectrum allocation objects and mutual interferences among the spectrum allocation objects. For example, the electronic apparatus may be applied on a side of a spectrum manager of a one-level shared spectrum allocation system. In addition, the first level SMs may interact with each other about spectrum resources allocated to first sets of spectrum allocation objects respectively managed by first level SMs.

In addition, the spectrum coordination information provided to the other first level SM may be spectrum coordination information of all spectrum allocation objects in the first set, or may be spectrum coordination information of a part of the spectrum allocation objects in the first set, for example, spectrum coordination information of spectrum allocation objects in an overlapped region of coverage ranges of two first level SMs.

In addition, the above procedures such as the procedure of sharing coordination information, the procedure of negotiating the spectrum utilization conflict, and the procedure of adjusting coordination information may be performed between the electronic apparatus and another first level SM. Details are not repeated herein.

Third Embodiment

Figure 14:
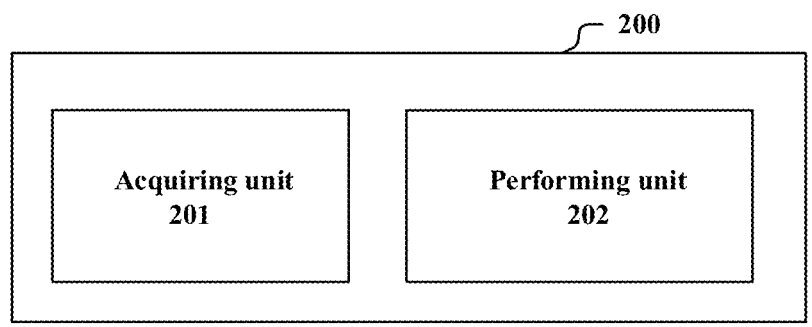
FIG. 14 is a block diagram showing functional modules of an electronic apparatus for wireless communications according to another embodiment of the present disclosure.

FIG. 14 is a block diagram showing functional modules of an electronic apparatus 200 for wireless communications according to another embodiment of the present disclosure. As shown in FIG. 14, the electronic apparatus 200 includes an acquiring unit 201 and a performing unit 202. The acquiring unit 201 is configured to acquire spectrum coordination information for a second set of spectrum allocation objects managed by a second level SM. The spectrum coordination information is used for coordination between spectrum allocation performed by the second level SM and spectrum allocation performed by a first level SM at an upper level of the second level SM. The performing unit 202 is configured to perform, at least based on the spectrum coordination information, spectrum allocation for the spectrum allocation objects in the second set.

The acquiring unit 201 and the performing unit 202 may be implemented by one or more processing circuitry. The processing circuitry may be implemented as, for example, a chip. The electronic apparatus 200 may be, for example, located in the second level SM or communicatively connected to the second level SM. For example, referring to the shared spectrum allocation system shown in FIG. 1, the electronic apparatus 200 may be located in the $SM^2_1$ or communicatively connected to the $SM^2_1$.

The spectrum coordination information described in this embodiment has the same definition as the spectrum coordination information described in the first embodiment. In addition, the second level SM further receives a spectrum allocation result from the first level SM, for example, the resource pool allocated from the first level SM to the second level SM.

For example, the spectrum coordination information may include one or more of the following: spectrum utilization constraint for the second set of spectrum allocation objects; constraint on a spectrum allocation rule for the second set of spectrum allocation objects; and information of the spectrum allocation objects in the second set and mutual interference relationship among the spectrum allocation objects in the second set. The spectrum coordination information has been described in detail in the first embodiment, and is not repeated herein.

The performing unit 202 performs local spectrum allocation at least based on the acquired spectrum coordination information. For example, the performing unit 202 allocates spectrum resources in a spectrum pool allocated from the first level SM to the second level SM to spectrum allocation objects managed by the second level SM, on the premise of following the spectrum coordination information.

In an example, the performing unit 202 further performs spectrum allocation based on a local transmission environment and measurement results. In this way, spectrum resources can be allocated in a manner of more conforming to an actual interference situation, thereby improving the spectrum utilization efficiency.

The performing unit 202 is further configured to, in a case of a spectrum utilization conflict occurring, generate a conflict resolution request to be provided to another second level SM or the first level SM. The conflict resolution request may include information of a victim spectrum allocation object.

An example of the procedure that the second level SM sends a conflict resolution request to the first level SM and the first level SM handles the conflict is described in the second embodiment. A procedure of handling a conflict between second level SMs is described below with reference to FIG. 15. When detecting a spectrum utilization conflict, a second level SM (1) generates a conflict resolution request, and sends the conflict resolution request to a second level SM (2). Upon receiving the conflict resolution request, the second level SM handles the conflict based on information included in conflict resolution request. For example, the second level SM (2) attempts to handle the conflict without changing the spectrum coordination information. Subsequently, the second level SM (2) sends a handling result of the conflict to the second level SM (1) as a response to the conflict resolution request.

Figure 15:
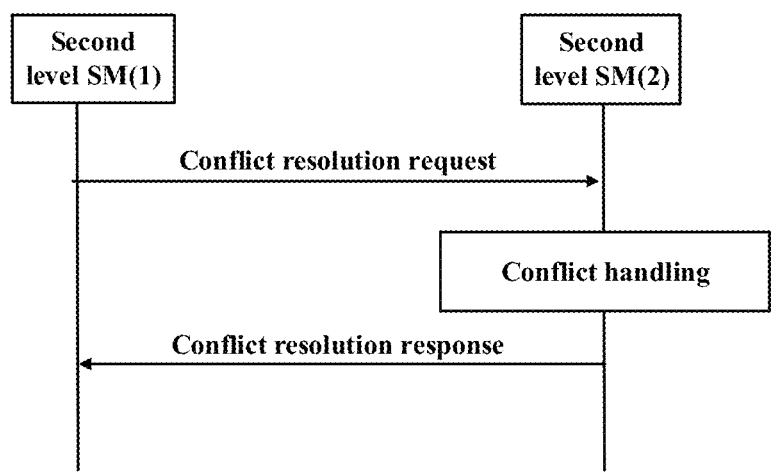
FIG. 15 is a schematic diagram showing a procedure of handling a conflict between two second level SMs.

When handling the conflict, the procedure of negotiating for spectrum utilization conflict shown in FIG. 15 may be performed one or more times. Further, the second level SM (1) and the second level SM (2) shown in FIG. 15 are interchangeable in roles. That is, the second level SM (2) may send a conflict resolution request to the second level SM (1) and the second level SM (1) handles the conflict.

Further, if the conflict cannot be handled based on the current spectrum coordination information, a procedure of adjusting coordination information may be performed. For example, the performing unit 202 generates a coordination information adjusting request to be provided to another second level SM or a first level SM which is to process the request. An example of sending the coordination information adjusting request to the first level SM has been described in the second embodiment, and is not repeated herein.

Figure 16:
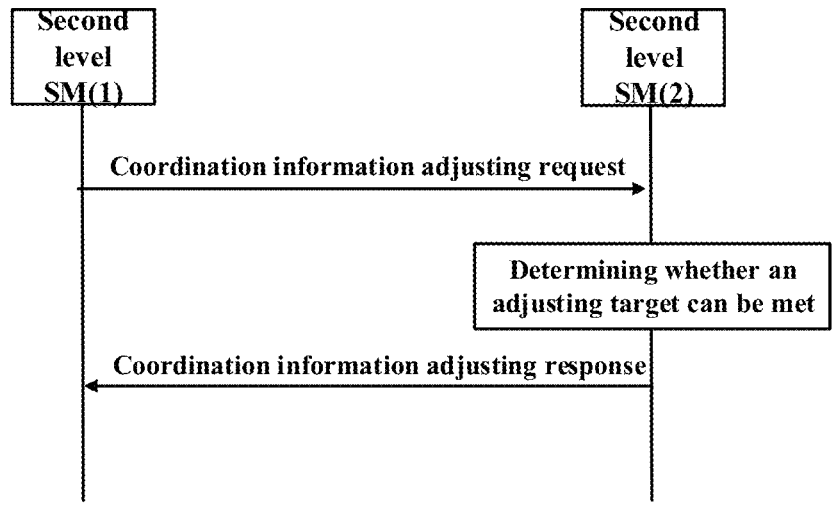
FIG. 16 is a schematic diagram showing a procedure of adjusting coordination information between two second level SMs.

FIG. 16 is a schematic diagram showing a procedure of adjusting coordination information between two second level SMs. A coordination information adjusting request may include an adjusting target for spectrum coordination information of another second level SM. In addition to being used to resolve the spectrum utilization conflict, the coordination information can also be adjusted to cause the second level SM to adapt new service requirements of the service device, or for any other purpose.

As shown in FIG. 16, the second level SM (1) sends a coordination information adjusting request to the second level SM (2). The coordination information adjusting request includes an adjusting target for the spectrum coordination information of the second level SM (2). The second level SM (2) checks whether the adjusting target can be met. For example, the second level SM (2) performs corresponding adjustment if the adjusting target can be met. Subsequently, the second level SM (2) sends a coordination information adjusting response to the second level SM (1) to report an adjusting result.

A premise for checking whether the adjusting target can be met may include, for example, not affecting a service device currently being served, improving the spectrum utilization efficiency of the entire system, or the like.

In addition, the performing unit 202 may be further configured to perform bandwidth expansion for a spectrum allocation object. For example, in addition to performing primary spectrum allocation, the performing unit 202 performs bandwidth expansion for the spectrum allocation object without affecting an existing spectrum allocation result.

Fourth Embodiment

For ease of understanding, instances of applying the technology according to the present disclosure at 3.5 GHz frequency band and 5 GHz frequency band are given in this embodiment. However, it should be understood that these instances are illustrative only rather than restrictive.

First Instance

Figure 17:
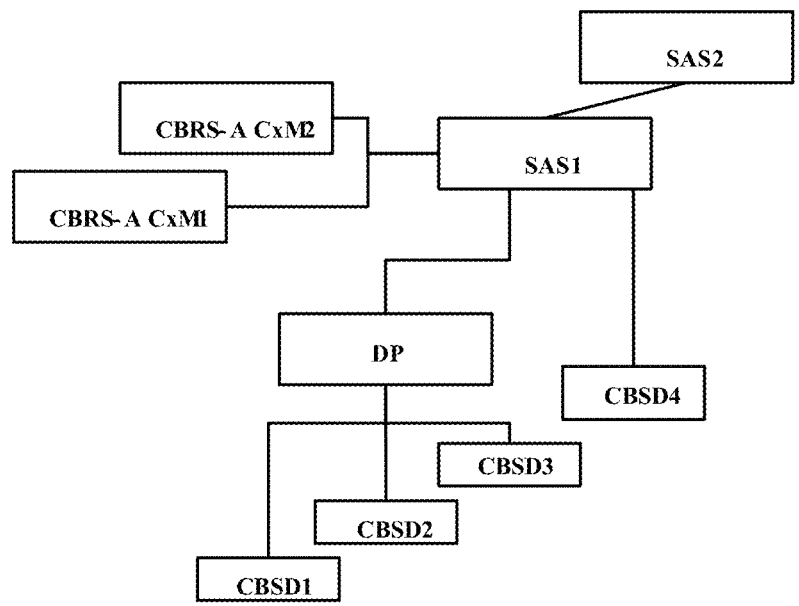
FIG. 17 shows an exemplary configuration of a shared spectrum allocation system located on 3.5 GHz frequency band.

A spectrum access system (SAS) developed by the WINN Forum (WINNF) studies coexistence management among multiple systems at the 3.5 GHz frequency band. In the United States, the 3.5 GHz frequency band is applied to a radar system of the Department of Defense (DoD). At present, the Federal Communications Commission (FCC) discusses commercial utilization of the 3.5 GHz frequency band by spectrum sharing. A shared system is a part of the SAS and includes three levels, namely, an incumbent user that represents the highest-level user, and a Citizens Broadband Radio Service Device (CBSD) including a level of priority access license (PAL) and a level of general authorized access (GAA). The incumbent user includes the above DoD radar system, a Fixed Satellite Service (FSS), and grandfathered terrestrial wireless operations in limited time. When utilizing the spectrum, the incumbent user is required to be protected from harmful interferences from the CBSD, and the PAL is required to be protected from harmful interferences from the GAA. A Citizens Broadband Radio Service (CBRS) performs resource allocation with a census tract as a unit. The priority access license may use the spectrum ranging from 3550 MHz to 3650 MHz. The priority access license is issued in a unit of 10 MHz for a period of 3 years. A total spectrum used by all PALs in each census tract does not exceed 70 MHz, and the spectrum used by each PAL does not exceed 40 MHz. The GAA may use a spectrum ranging from 3550 Hz to 3700 MHz while ensuring not to produce harmful interferences to a high-level user. The logical entities for resource management mainly include an SAS and a Domain Proxy (DP), as shown in FIG. 17. The domain proxy represents that an individual CBSD or a network CBSD interacts with the SAS so as to obtain a service for CBSD. Alternatively, the CBSD may directly interact with the SAS to obtain a service without via a domain proxy.

Figure 18:
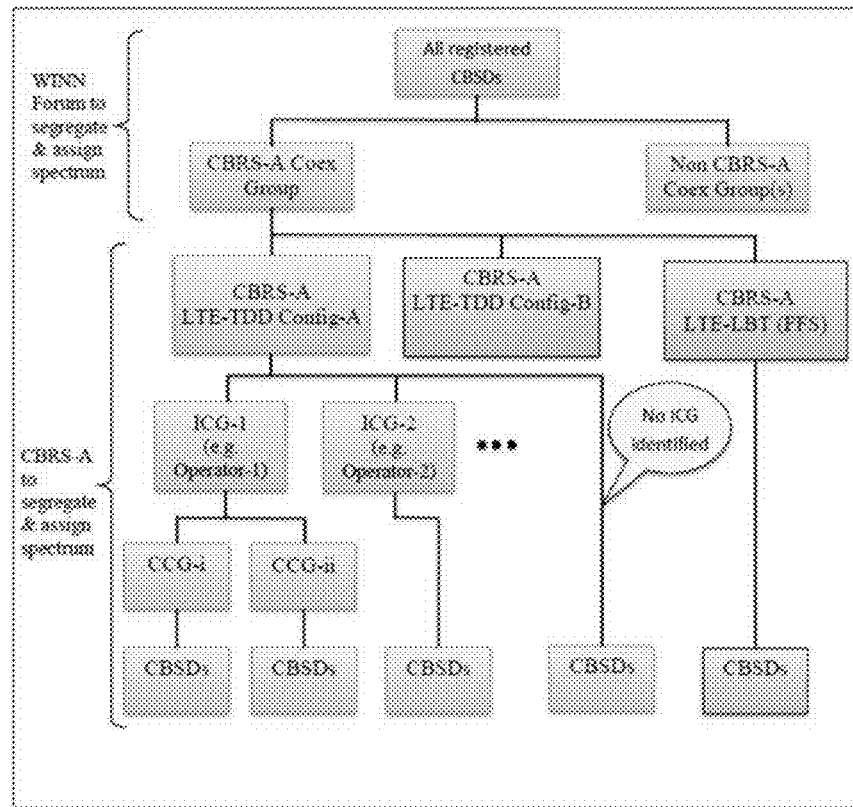
FIG. 18 shows correlation among multiple concepts in a technical specification developed by the CBRS Alliance (CBRS-A)
Figure 19:
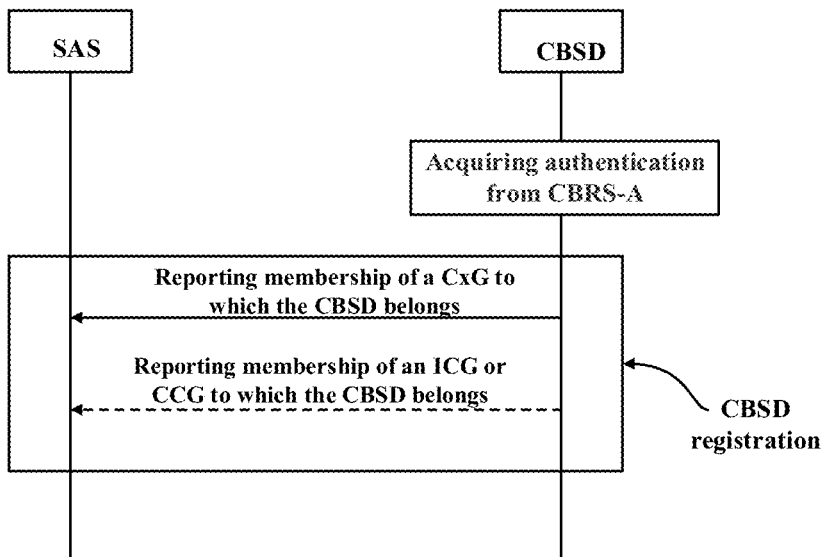
FIG. 19 is a schematic diagram showing a procedure for a CBSD authenticated by the CBRS-A reporting membership to an SAS.

The Technical Specification (TS) developed by the CBRS Alliance (CBRS-A) provides coexistence between different CBSDs. Physical instances of these CBSDs are LTE variants, such as an LTE-TDD (FS2), or an LTE-LBT (FS3). The TS mainly focuses on GAA coexistence requirement in the CBSD. FIG. 18 shows the correlation among multiple concepts in the TS. All CBSD users registered in the SAS are generally divided into a coexistence group (CxG) managed by the CBRS-A and a coexistence group not managed by the CBRS-A. The SAS developed by the WINNF is in charge of spectrum division and spectrum allocation for these coexistence groups. In the coexistence group managed by the CBRS-A, a logical entity coexistence manager (CxM) manages coexistence among GAA users in the CxG according to a rule of the SAS. In addition, depending on types of physical implementations, CBSDs are further divided into CBRS-A LTE-TDD Config-A, CBRS-A LTE-TDD Config-B, and CBRS-A LTE-LBT. In each type, for example, in the CBRS-A LTE-TDD Config-A, CBSDs may be further divided into multiple interference coordination groups (ICGs). CBSDs belonging to one ICG can manage interferences among them, so that spectrum orthogonality is unnecessary. In each ICG, CBSDs may be further divided into multiple Common Channel Groups (CCGs). CBSDs belonging to one CCG request the same Primary Channel Assignment. FIG. 19 is a schematic diagram showing a procedure where a CBSD authorized by the CBRS-A reports membership to an SAS. The CBSD authorized by the CBRS-A registers at the SAS by means of this procedure. The CBSD reports membership of a CxG to which the CBSD belongs to the SAS. Optionally, as indicated by a dotted line in FIG. 19, the CBSD further reports membership of an ICG or a CCG to which the CBSD belongs to the SAS.

In this instance, the first level spectrum manager is implemented as the SAS, the second level spectrum manager is implemented as the CxM, and the spectrum allocation object is the CBSD. The SAS performs spectrum allocation for the CxG. The SAS may perform a graph-based process when determining spectrum availability. A specific spectrum allocation method may be developed by the WINNF. For example, SAS constructs a Graphs based on information of the CBSD, so as to perform spectrum allocation.

Figure 20:
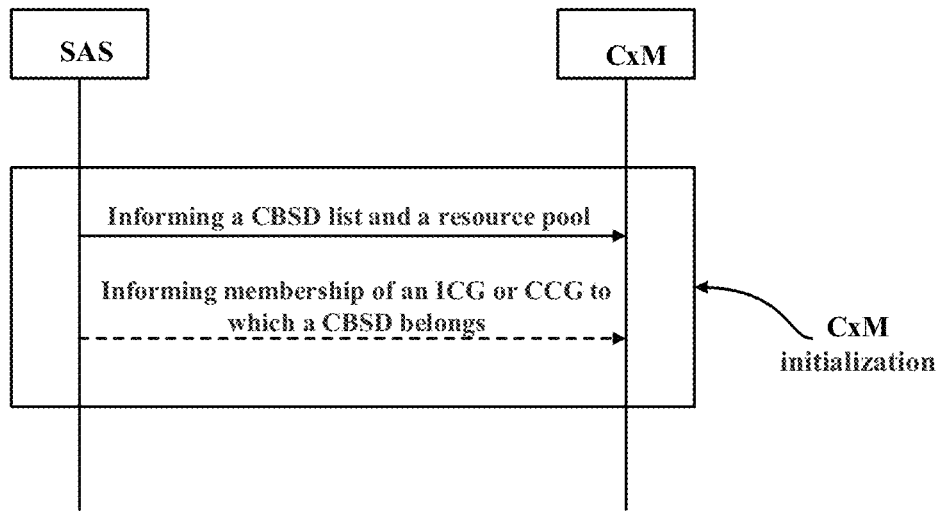
FIG. 20 is a schematic diagram showing an information procedure during CxM initialization.

The CxM performs Primary Channel Assignment for the CBSDs. CBRS-A CxG is managed by one CxM. Referring to FIG. 20, during initialization, the CxM acquires a group of active CBSDs managed by the CxM and a spectrum pool for these CBSDs from the SAS. Optionally, as indicated by a dotted line in FIG. 20, the CxM further acquires membership of an ICG or CCG to which these CBSDs belong from the SAS. In addition, when applying the technology according to the present disclosure, the CxM further acquires spectrum coordination information (not shown in the drawings) for these CBSDs from SAS.

The CxM constructs a new GraphM based on the information provided by the SAS together with the local transmission environment and wireless measurement results. Compared to the Graphs, in the GraphM, some edges can be further removed to change a Connected Set in the graph. Therefore, the GraphM constructed by the CxM is based on a more realistic model assumption, by taking configurations of different physical layers (such as a TDD configuration, for example, a configuration of LTE-TDD vs. LTE-LBT) into consideration. Further, the spectrum pool is divided based on the Connected Set.

When performing spectrum allocation, the CxM performs spectrum allocation for each Connected Set and a spectrum pool associated with the Connected Set. Further, in order to ensure coexistence of LTE-TDD CBSD, the CxM takes an overlap of coverage ranges of different CCGs into account, to construct an LTE-TDD overlap graph $Graph_{cp}$. Each vertex represents one CCG Partition. The CCG Partition is a subset of the CCG. There is no overlap of coverage ranges between CCG Partitions. An edge connecting vertexes represents that there is an overlap between coverage ranges of the CBSDs corresponding to the vertexes. If CBSDs corresponding to two vertexes are in one ICG, there is no edge connecting the two vertexes.

The CxM performs Primary Channel Assignment based on the $Graph_{cp}$, and performs Primary Channel Assignment for the Connected Set separately. For example, spectrum allocation is performed by coloring the graph. It is desired to color each Connected Set with the least number of colors (the number of colors is represented by N). That is, it is expected to meet the spectrum requirements of CBSDs in the Connected Set with the least spectrum resources. An available spectrum pool corresponding to the Connected Set is orthogonally divided into N primary channels in an uniform form. For each vertex, spectrum resources of a channel corresponding to the color of the vertex are allocated to the vertex.

In addition, the CxM may further perform bandwidth expansion for the CBSD in addition to Primary Channel Assignment. For example, the bandwidth expansion is required to meet the following requirements: the bandwidth expansion does not affect normal utilization of an existing result of the primary channel assignment; and the bandwidth expansion does not affect interferences protection requirement for an incumbent user and a PAL user.

In this instance, with the technology according to the present disclosure, that is, the SAS provides spectrum coordination information to the CxM, spectrum allocation performed by the SAS and local spectrum allocation performed by the CxM can be coordinated, thereby balancing the fairness, flexibility and spectrum allocation efficiency of spectrum allocation for the entire system.

Second Instance

Developing a technology for a 5G broadband system is one of goals of the European Commission. Researching results include a project of Broadband Radio Access Networks (BRAN): central cooperation of WAS/RLAN at the 5 GHz frequency band.

A logical entity for management in this system is referred to as C3 (Central Controller and Coordinator). A physical instance of the logical entity is referred to as C3 instance. The C3 instance may be implemented as multiple C3 instances that are interconnected and intercommunicated to each other in a distributed manner, which perform central coordination for management objects by information interaction.

In a case that the technology according to the present disclosure is applied to the 5G broadband system, the first level SM may be implemented as a C3 instance, and the spectrum allocation object may be implemented as a WAS/RLAN.

Although the instances of 3.5 GHz and 5 GHz are given above, but they are not restrictive. The technology according to the present disclosure is also applicable to other unauthorized frequency bands.

Fifth Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the methods for wireless communications described below may be executed by a computer-executable program completely, although the hardware and/or firmware of the electronic apparatus for wireless communications can also be used in the methods.

Figure 21:
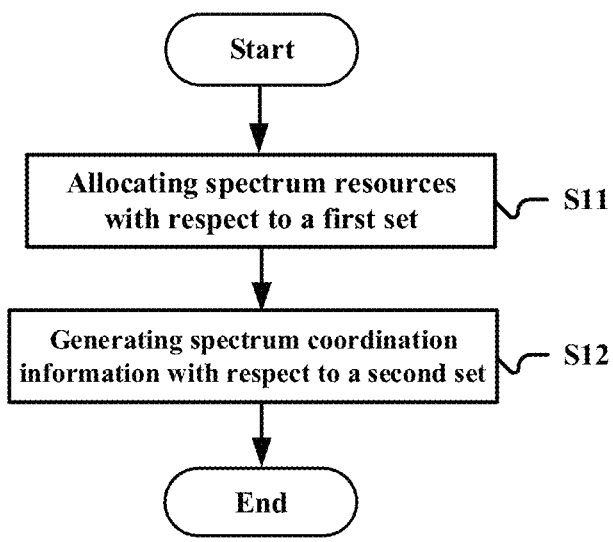
FIG. 21 is a flowchart of a method for wireless communications according to an embodiment of the present disclosure.

FIG. 21 is a flowchart of a method for wireless communications according to an embodiment of the present disclosure. The method includes: with respect to a first set of spectrum allocation objects managed by a first level spectrum manager, allocating spectrum resources (S11); and with respect to a second set of spectrum allocation objects managed by a second level spectrum manager at a lower level of the first level spectrum manager, generating spectrum coordination information to be provided to the second level spectrum manager (S12). The spectrum coordination information is used for coordination between spectrum allocation performed by the second level spectrum manager and spectrum allocation performed by the first level spectrum manager.

In an example, the spectrum coordination information includes spectrum utilization constraint for the second set of spectrum allocation objects. The spectrum utilization constraint may include but is not limited to one or more of the following: a total emission power of the spectrum allocation objects within a particular geographical region does not exceed a predetermined power; the number of spectrum allocation objects emitting simultaneously within the particular geographical region does not exceed a predetermined value; a total emission power of the spectrum allocation objects on a particular frequency does not exceed a predetermined power; the number of spectrum allocation objects emitting simultaneously on a particular frequency does not exceed a predetermined value; a total emission power of the spectrum allocation objects within a particular geographical region on a particular frequency does not exceed a predetermined power; the number of spectrum allocation objects emitting simultaneously within the particular geographical region on a particular frequency does not exceed a predetermined value; a power received at a predetermined reference point from the spectrum allocation objects does not exceed a predetermined power; and a power received at a predetermined reference point on a particular frequency from the spectrum allocation objects does not exceed a predetermined power.

In another example, the spectrum coordination information includes constraint on a spectrum allocation rule for a second set of spectrum allocation objects. The constraint on a spectrum allocation rule may include one or more of the following: specifying an investigating order of the spectrum allocation objects and specifying an investigating order of unit spectrum resources to be allocated; and specifying a characteristic set of the spectrum allocation objects and a spectrum allocation result for the spectrum allocation objects of the characteristic set.

In another example, the spectrum coordination information includes information of the spectrum allocation objects within the second set and mutual interference relationship among the spectrum allocation objects within the second set.

For example, the information may be represented in a form of an abstract model based on graph theory. Alternatively, the information may be represented in a form of a generation method of an abstract model based on graph theory. The information may include mapping relationship between a vertex in the graph and a spectrum allocation object, and a generation condition for an edge in the graph. The generation condition for the edge may include, for example, one of the following: calculated signal coverage regions for spectrum allocation objects corresponding to vertexes overlap with each other; there are interferences among spectrum allocation objects corresponding to the vertexes calculated based on a channel model; and there are interferences between spectrum allocation objects corresponding to the vertexes obtained by measurement.

In step S11, the spectrum resources may be allocated based on the spectrum allocation objects and interferences among the spectrum allocation objects.

In addition, although not shown in the Figure, the above method may further include a step of providing spectrum coordination information of the first level spectrum manager to another first level spectrum manager. For example, updated spectrum coordination information may be provided in response to a coordination information updating request from the other first level spectrum manager. Update acknowledgement for the spectrum coordination information may be acquired from the other first level spectrum manager.

In addition, in a case of a spectrum utilization conflict occurring, a conflict resolution request can also be generated. The conflict resolution request is provided to the other first level spectrum manager which is to handle the conflict. The conflict resolution request includes, for example, information of a victim spectrum allocation object. The above method further includes a step of acquiring a handling result of the conflict from the other first level spectrum manager.

In appropriate cases, the above method further includes a step of generating a coordination information adjusting request to be provided to the other first level spectrum manager which is to process the request. The coordination information adjusting request may include an adjusting target for spectrum coordination information of the other first level spectrum manager.

In addition, the conflict may be handled in response to the conflict resolution request from the second level spectrum manager or the other first level spectrum manager. The spectrum coordination information may be adjusted in response to the coordination information adjusting request from the second level spectrum manager or the other first level spectrum manager.

For example, in a case that the spectrum resource is located at 3.5 GHz frequency band, the first level spectrum manager is implemented as an SAS, the second level spectrum manager is implemented as a CxM, and the spectrum allocation object is a CBSD. In a case that the spectrum resource is located at 5 GHz frequency band, the first level spectrum manager is implemented as a central controller and a coordinator instance, and the spectrum allocation object is a wireless access system/radio local area network.

Figure 22:
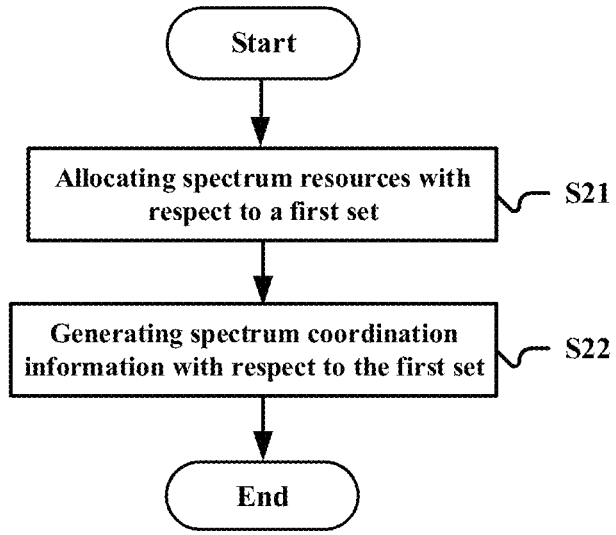
FIG. 22 is a flowchart of a method for wireless communications according to another embodiment of the present disclosure.

FIG. 22 is a flowchart of a method for wireless communications according to another embodiment of the present disclosure. The method includes: with respect to a first set of spectrum allocation objects managed by a first level spectrum manager, allocating spectrum resources (S21); and with respect to the first set of spectrum allocation objects, generating spectrum coordination information to be provided to another first level spectrum manager (S22). The spectrum coordination information is used for coordination between spectrum allocation performed by the first level spectrum manager and spectrum allocation performed by the other first level spectrum manager.

Figure 23:
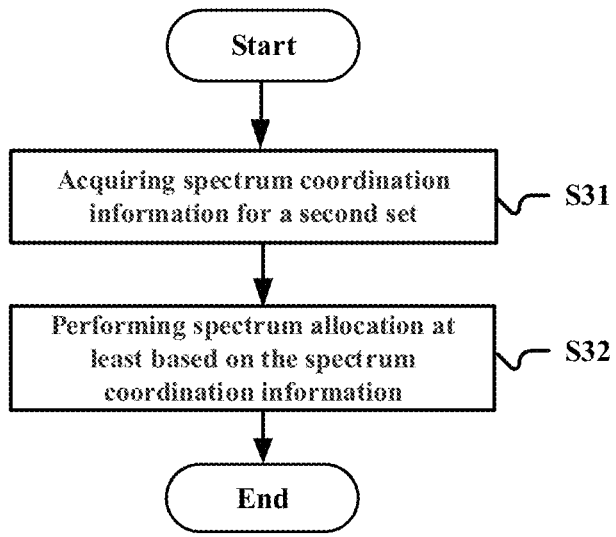
FIG. 23 is a flowchart of a method for wireless communications according to another embodiment of the present disclosure.

FIG. 23 is a flowchart of a method for wireless communications according to another embodiment of the present disclosure. The method includes: acquiring spectrum coordination information for a second set of spectrum allocation objects managed by a second level spectrum manager, where the spectrum coordination information is used for coordination between spectrum allocation performed by the second level spectrum manager and spectrum allocation performed by a first level spectrum manager at an upper level of the second level spectrum manager (S31); and performing, at least based on the spectrum coordination information, spectrum allocation for the spectrum allocation objects in the second set (S32).

For example, in step S32, the spectrum allocation may be performed based on a local transmission environment and measurement results. The spectrum coordination information may include one or more of the following: spectrum utilization constraint for the second set of spectrum allocation objects, constraint on a spectrum allocation rule for the second set of spectrum allocation objects, and information of the spectrum allocation objects in the second set and mutual interference relationship among the spectrum allocation objects in the second set.

In an example, the spectrum coordination information further includes membership of an interference coordination group (ICG) or a common channel group (CCG) to which the CBSD belongs.

Although not shown in the drawings, the above method may further include a step of generating a conflict resolution request in a case of a spectrum utilization conflict occurring, to be provided to another second level spectrum manager or the first level spectrum manager. The conflict resolution request includes, for example, information of a victim spectrum allocation object.

In addition, the above method may further include a step of generating a coordination information adjusting request to be provided to the other second level spectrum manager or the first level spectrum manager. The coordination information adjusting request includes, for example, a desired adjusting target of the spectrum coordination information of the second level spectrum manager. In addition, bandwidth expansion may be performed for the spectrum allocation object.

It should be noted that the above methods may be performed in combination or separately. Details of the above methods are described in detail in the first to fourth embodiments, and are not repeated herein.

The technology according to the present disclosure is applicable to various products. For example, the electronic apparatus 100 or 200 may be implemented as any type of server, such as a tower server, a rack server, and a blade server. The electronic apparatus 100 or 200 may be a control module (such as an integrated circuitry module including a single die, and a card or a blade inserted into a slot of a blade server) mounted on a server.

[Application Example for a Server]

Figure 24:
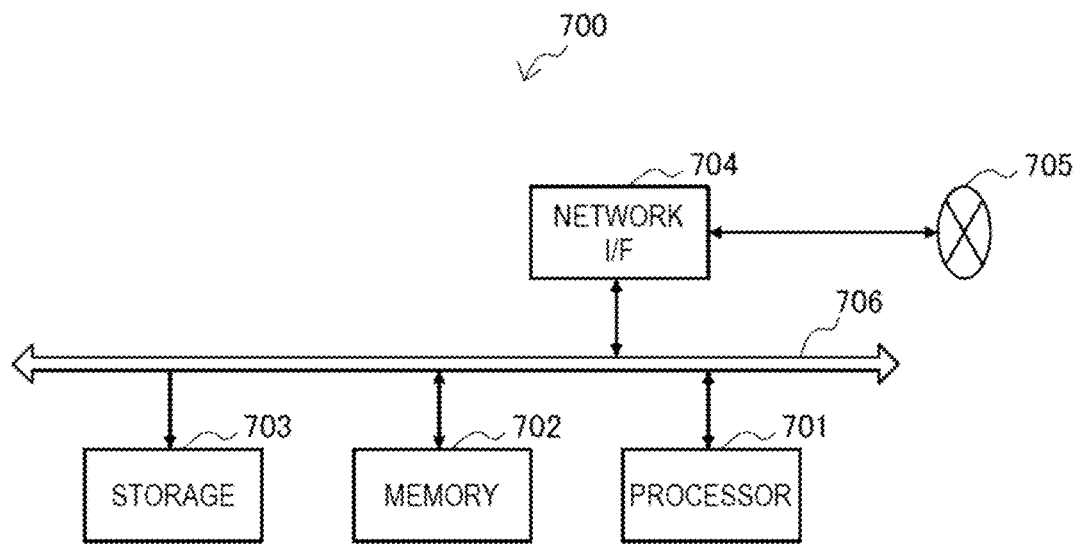
FIG. 24 is a block diagram showing an exemplary configuration of a server 700 to which technology according to the present disclosure may be applied.

FIG. 24 is a block diagram showing an example of a schematic configuration of a server 700 to which the technology of the present disclosure may be applied. The server 700 includes a processor 701, a memory 702, a storage 703, a network interface (I/F) 704, and a bus 706.

The processor 701 may be for example a central processing unit (CPU) or a digital signal processor (DSP), and control functions of the server 700. The memory 702 includes a random access memory (RAM) and a read-only memory (ROM), and stores a program that is executed by the processor 701, and data. The storage 703 may include a memory medium, such as a semiconductor memory and a hard disc.

The network interface 704 is a communication interface for connecting the server 700 to a communication network 705. The communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high-speed bus and a low-speed bus), each of which has different speed.

In the server 700 shown in FIG. 24, the allocating unit 101 and the generating unit 102 described with reference to FIG. 2, and the acquiring unit 201 and the performing unit 202 described with reference to FIG. 14 may be implemented by the processor 701. For example, the processor 701 may generate the spectrum coordination information by performing functions of the allocating unit 101 and the generating unit 102, and perform the local spectrum allocation based on the spectrum coordination information by performing functions of the acquiring unit 201 and the performing unit 202.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2500 shown in FIG. 25) from a storage medium or network, wherein the computer is capable of implementing various functions when installed with various programs.

Figure 25:
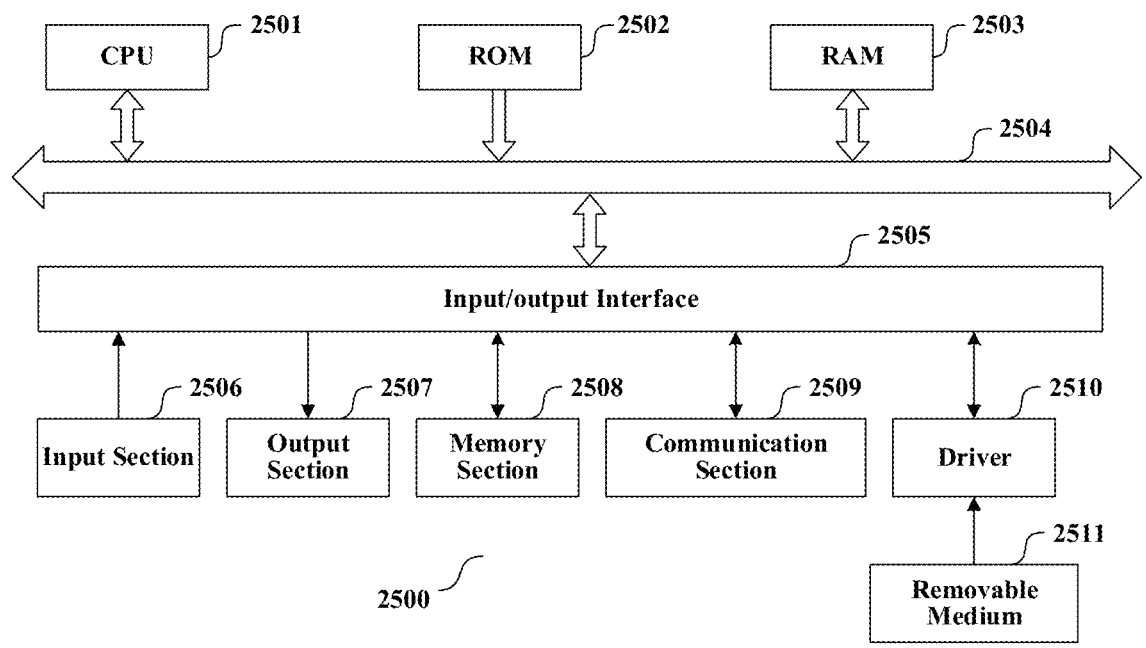
FIG. 25 is a block diagram of an exemplary block diagram illustrating the structure of a general purpose personal computer capable of realizing the method and/or device and/or system according to the embodiments of the present disclosure.

In FIG. 25, a central processing unit (CPU) 2501 executes various processing according to a program stored in a read-only memory (ROM) 2502 or a program loaded to a random access memory (RAM) 2503 from a memory section 2508. The data needed for the various processing of the CPU 2501 may be stored in the RAM 2503 as needed. The CPU 2501, the ROM 2502 and the RAM 2503 are linked with each other via a bus 2504. An input/output interface 2505 is also linked to the bus 2504.

The following components are linked to the input/output interface 2505: an input section 2506 (including keyboard, mouse and the like), an output section 2507 (including displays such as a cathode ray tube (CRT), a liquid crystal display (LCD), a loudspeaker and the like), a memory section 2508 (including hard disc and the like), and a communication section 2509 (including a network interface card such as a LAN card, modem and the like). The communication section 2509 performs communication processing via a network such as the Internet. A driver 2510 may also be linked to the input/output interface 2505, if needed. If needed, a removable medium 2511, for example, a magnetic disc, an optical disc, a magnetic optical disc, a semiconductor memory and the like, may be installed in the driver 2510, so that the computer program read therefrom is installed in the memory section 2508 as appropriate.

In the case where the foregoing series of processing is achieved through software, programs forming the software are installed from a network such as the Internet or a memory medium such as the removable medium 2511.

It should be appreciated by those skilled in the art that the memory medium is not limited to the removable medium 2511 shown in FIG. 25, which has program stored therein and is distributed separately from the apparatus so as to provide the programs to users. The removable medium 2511 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2502 and the memory section 2508 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. A spectrum manager, in a wireless communication system, comprising:
   processing circuitry, configured to:
   with respect to a first set of spectrum allocation objects managed by the spectrum manager, allocate spectrum resources; and
   with respect to a second set of spectrum allocation objects managed by a second level spectrum manager at a lower level of the spectrum manager, generate spectrum coordination information to be provided to the second level spectrum manager, wherein the spectrum coordination information is used for coordination between spectrum allocation performed by the second level spectrum manager and spectrum allocation performed by the spectrum manager.

2. The spectrum manager according to claim 1, wherein the spectrum coordination information comprises constraint on a spectrum allocation rule for the second set of spectrum allocation objects, and
   the constraint on the spectrum allocation rule comprises one or more of the following: specifying an investigating order of the spectrum allocation objects and specifying an investigating order of unit spectrum resources to be allocated; and specifying a characteristic set of the spectrum allocation objects and a spectrum allocation result for the spectrum allocation objects of the characteristic set.

3. The spectrum manager according to claim 1, wherein the spectrum coordination information further comprises one or more of the following: spectrum utilization constraint for the second set of spectrum allocation objects; information of the spectrum allocation objects within the second set and mutual interference relationship between them.

4. The spectrum manager according to claim 3, wherein the spectrum utilization constraint comprises one or more of the following: a total emission power of the spectrum allocation objects within a particular geographical region does not exceed a predetermined power; the number of spectrum allocation objects emitting simultaneously within the particular geographical region does not exceed a predetermined value; a total emission power of the spectrum allocation objects on a particular frequency does not exceed a predetermined power; the number of spectrum allocation objects emitting simultaneously on a particular frequency does not exceed a predetermined value; a total emission power of the spectrum allocation objects within a particular geographical region on a particular frequency does not exceed a predetermined power; the number of spectrum allocation objects emitting simultaneously within the particular geographical region on a particular frequency does not exceed a predetermined value; a power received at a predetermined reference point from the spectrum allocation objects does not exceed a predetermined power; and a power received at a predetermined reference point on a particular frequency from the spectrum allocation objects does not exceed a predetermined power.

5. The spectrum manager according to claim 3, wherein the processing circuitry is configured to represent the information in a form of an abstract model based on graph theory, or represent the information in a form of a generation method of an abstract model based on graph theory.

6. The spectrum manager according to claim 5, wherein in a case that the information is represented in a form of a generation method of an abstract model based on graph theory, the information comprises: a mapping relationship between a vertex in a graph and a spectrum allocation object, and a generation condition for an edge in the graph.

7. The spectrum manager according to claim 6, wherein the generation condition for the edge comprises one of: calculated signal coverages for spectrum allocation objects corresponding to the vertexes overlap with each other; there are interferences between spectrum allocation objects corresponding to the vertexes by calculation based on a channel model; and there are interferences between spectrum allocation objects corresponding to the vertexes by measurement.

8. The spectrum manager according to claim 1, wherein the processing circuitry is further configured to provide the spectrum coordination information of the spectrum manager to another spectrum manager, wherein the processing circuitry is configured to provide updated spectrum coordination information in response to a coordination information updating request from the other spectrum manager.

9. The spectrum manager according to claim 8, wherein the processing circuitry is further configured to acquire, from the other spectrum manager, update acknowledgement for the spectrum coordination information.

10. The spectrum manager according to claim 8, wherein in a case of spectrum utilization conflict occurring, the processing circuitry is further configured to generate a conflict resolution request to be provided to the other spectrum manager which is to handle the conflict, wherein the conflict resolution request comprises information of a victim spectrum allocation object.

11. The spectrum manager according to claim 10, wherein the processing circuitry is further configured to acquire, from the other spectrum manager, a handling result of the conflict.

12. The spectrum manager according to claim 8, wherein the processing circuitry is further configured to generate a coordination information adjusting request, to be provided to the other spectrum manager which is to process the request, wherein the coordination information adjusting request comprises an adjusting target for the spectrum coordination information of the other spectrum manager.

\* \* \* \* \*